(12) United States Patent
Shih et al.

(10) Patent No.: US 10,922,112 B2
(45) Date of Patent: Feb. 16, 2021

(54) APPLICATION AWARE STORAGE RESOURCE MANAGEMENT

(71) Applicant: VMware, Inc., Palo Alto, CA (US)

(72) Inventors: Chiao-Chuan Shih, San Jose, CA (US); Samdeep Nayak, Sunnyvale, CA (US); Sanjay Vasudev Acharya, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/283,886

(22) Filed: May 21, 2014

(65) Prior Publication Data

US 2015/0339143 A1 Nov. 26, 2015

(51) Int. Cl.
*G06F 9/455* (2018.01)
*G06F 9/50* (2006.01)

(52) U.S. Cl.
CPC .......... *G06F 9/45558* (2013.01); *G06F 9/455* (2013.01); *G06F 9/5077* (2013.01); *G06F 2009/45579* (2013.01)

(58) Field of Classification Search
CPC ....... G06F 2009/45579; G06F 9/45558; G06F 9/455; G06F 9/5077
See application file for complete search history.

(56) References Cited

U.S. PATENT DOCUMENTS

| | | | |
|---|---|---|---|
| 8,347,302 B1 | 1/2013 | Vincent et al. | |
| 8,776,050 B2 * | 7/2014 | Plouffe | G06F 9/45537 718/1 |
| 2006/0253678 A1 * | 11/2006 | Gusler | G06F 3/0605 711/170 |
| 2006/0277383 A1 * | 12/2006 | Hayden | H04L 69/14 711/170 |
| 2007/0061441 A1 * | 3/2007 | Landis | G06F 9/5077 709/224 |
| 2008/0028409 A1 | 1/2008 | Cherkasova et al. | |
| 2008/0046463 A1 | 2/2008 | Haller | |
| 2010/0037089 A1 | 2/2010 | Krishnan et al. | |
| 2010/0145647 A1 | 6/2010 | Bouchard et al. | |
| 2010/0235832 A1 * | 9/2010 | Rajagopal | G06F 3/0605 718/1 |
| 2010/0299419 A1 * | 11/2010 | Ramankutty | H04W 24/02 709/221 |

(Continued)

OTHER PUBLICATIONS

Meng et al. Efficient Resource Provisioning in Compute Clouds via VM Multiplexing. [online] (Jun. 11, 2010). ACM., pp. 1-10. Retrieved From the Internet <http://citeseerx.ist.psu.edu/viewdoc/download?doi=10.1.1.472.8844&rep=rep1&type=pdf>.*

(Continued)

*Primary Examiner* — Emerson C Puente
*Assistant Examiner* — Jonathan R Labud

(57) ABSTRACT

A virtualization platform can discover capabilities of data devices connected in a virtual infrastructure. The virtualization platform allows a user (e.g., system administrator) to specify a policy profile for a virtual machine in terms of performance and data handling parameters. The virtualization platform can provision a virtual machine comprising data devices having a combined capability that matches the policy profile. Enforcement of a policy profile can be made when I/O is performed by a virtual machine.

20 Claims, 15 Drawing Sheets

(56) References Cited

U.S. PATENT DOCUMENTS

| | | | | |
|---|---|---|---|---|
| 2010/0306382 | A1* | 12/2010 | Cardosa | G06F 9/5044 709/226 |
| 2010/0306772 | A1* | 12/2010 | Arnold | G06F 8/36 718/1 |
| 2011/0023114 | A1 | 1/2011 | Diab et al. | |
| 2011/0093849 | A1* | 4/2011 | Chawla | H04L 41/0816 718/1 |
| 2011/0138384 | A1 | 6/2011 | Bozek et al. | |
| 2011/0188391 | A1 | 8/2011 | Sella et al. | |
| 2011/0238820 | A1* | 9/2011 | Matsuoka | G06F 9/5077 709/224 |
| 2011/0289205 | A1 | 11/2011 | Hansson et al. | |
| 2012/0158923 | A1* | 6/2012 | Mohamed | G06F 9/5077 709/220 |
| 2012/0185913 | A1* | 7/2012 | Martinez | G06F 9/455 726/1 |
| 2012/0266163 | A1 | 10/2012 | Durham et al. | |
| 2013/0007088 | A1 | 1/2013 | Alfredo et al. | |
| 2013/0054910 | A1 | 2/2013 | Vaghani et al. | |
| 2013/0148654 | A1* | 6/2013 | Sayani | H04L 49/356 370/389 |
| 2013/0212577 | A1 | 8/2013 | Nayak et al. | |
| 2013/0311989 | A1 | 11/2013 | Ota et al. | |
| 2014/0130055 | A1 | 5/2014 | Guha | |
| 2015/0143164 | A1 | 5/2015 | Veerla et al. | |

OTHER PUBLICATIONS

Office Action dated Jan. 29, 2016; U.S. Appl. No. 14/283,938; (16 pgs.).

Office Action dated Jul. 28, 2016; U.S. Appl. No. 14/283,938; (20 pgs.).

Office Action dated Mar. 23, 2017; U.S. Appl. No. 14/283,938; (17 pgs.).

Office Action dated Sep. 8, 2017; U.S. Appl. No. 14/283,938; (19 pgs.).

* cited by examiner

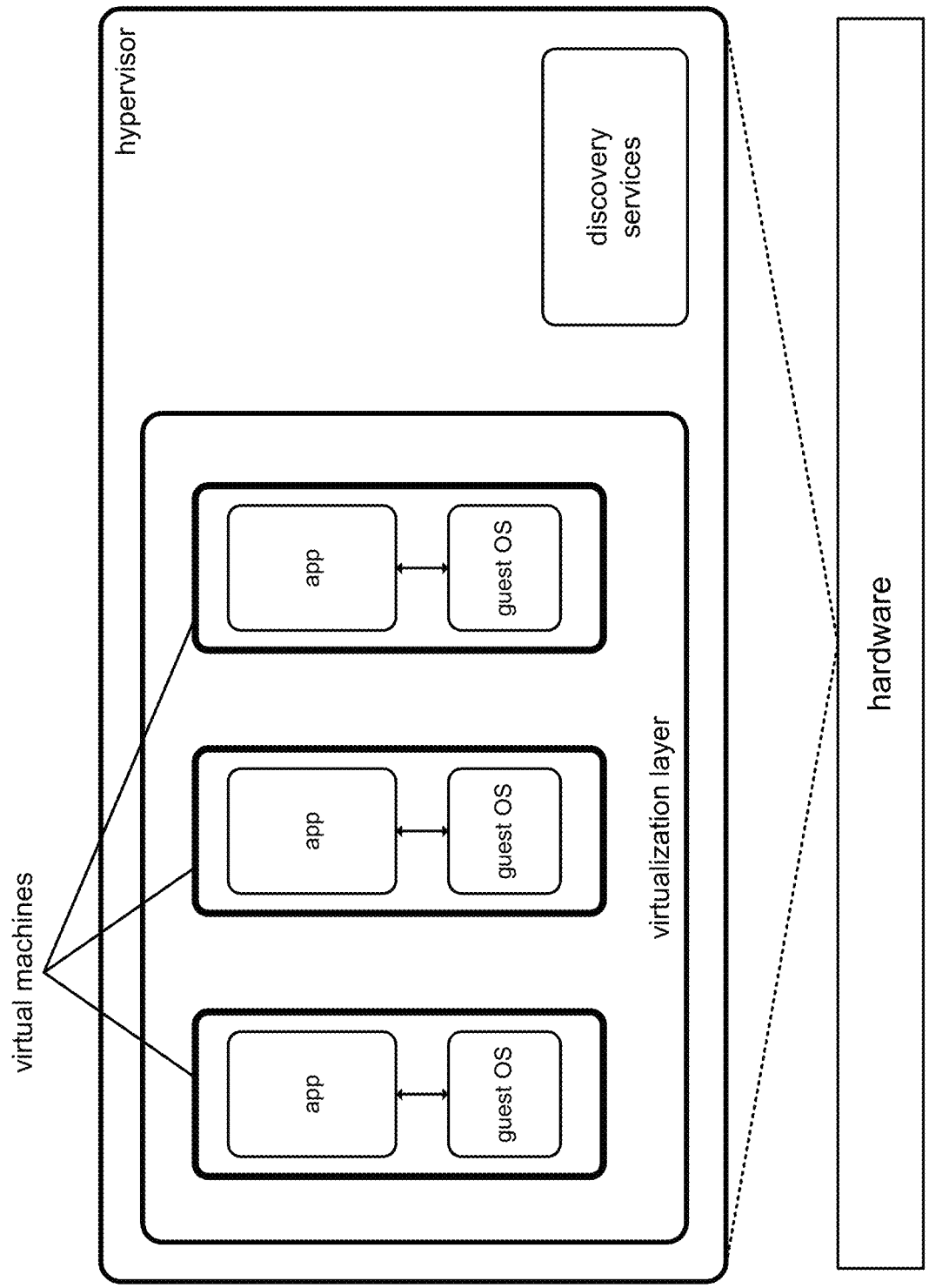

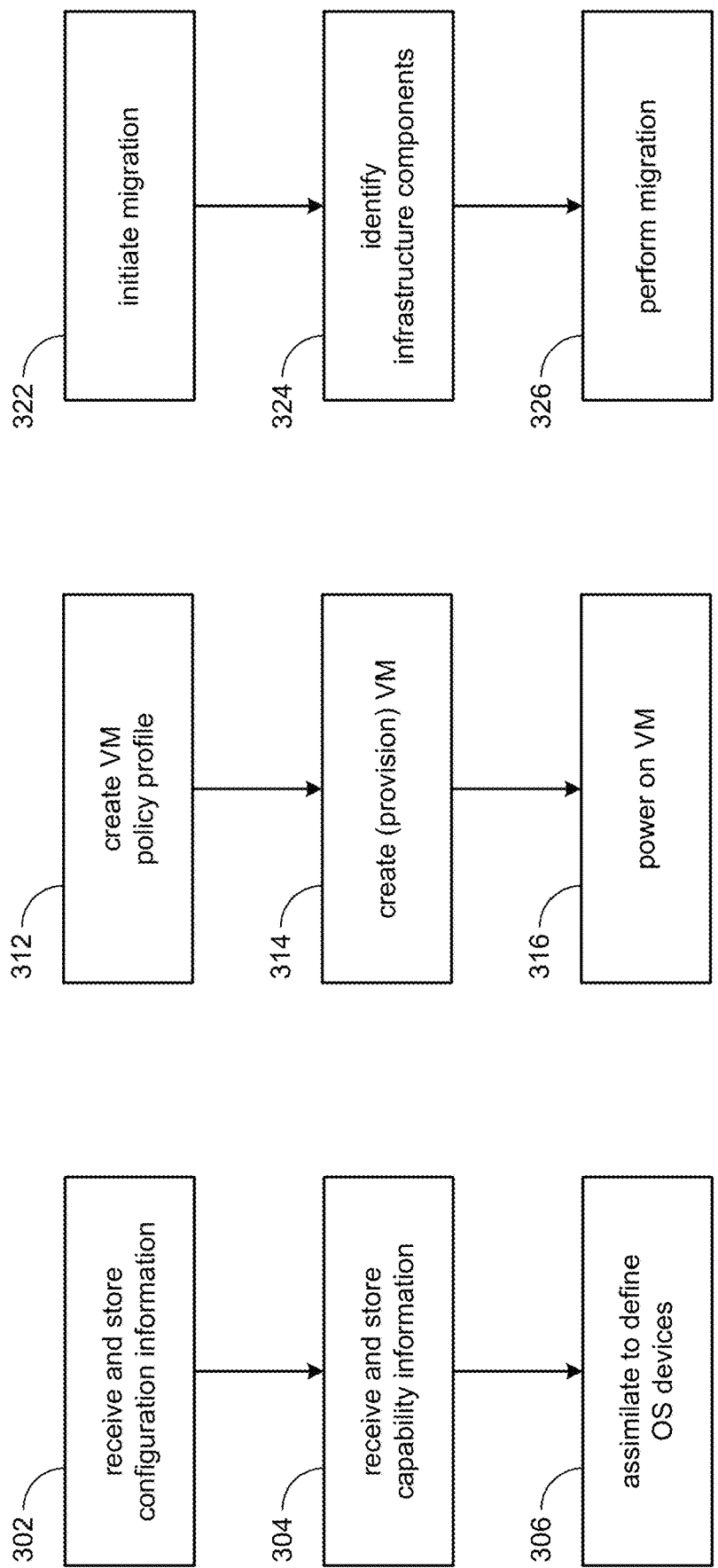

APPLICATION AWARE STORAGE RESOURCE MANAGEMENT

BACKGROUND

A virtual machine is a software implementation of a physical computer that, like an actual physical computer, runs an operating system (sometimes referred to as guest operating system, GOS) and applications. Each virtual machine has access to virtual, or software-based, hardware, including a virtual CPU, memory, hard disk, and network interface card. Software called the hypervisor is installed on the physical hardware in a virtualized datacenter, and acts as a platform for virtual machines.

The hypervisor provides a platform for running virtual machines and allows for the consolidation of the platform's physical computing resources. The hypervisor provides software representations of physical hardware resources dynamically to virtual machines as needed to support operation of the virtual machines. The hypervisor allows virtual machines to operate with a degree of independence from the underlying physical hardware. For example, a virtual machine can be moved from one physical host to another (sometimes referred to a virtual machine migration) or its virtual disks can be moved from one type of storage to another (sometimes referred to as virtual storage migration), without affecting the functioning of the virtual machine.

As virtualization proliferates in datacenters, it has made life simple for the administrators to deploy various applications using virtual machine (VM) templates for creating virtual machines. Today, virtualization software emulates generic storage and network hardware interfaces to the guest operating systems, and seems to meet most of the existing application requirements.

While virtualization continues to gain popularity, several hardware advancements have taken place in the datacenter landscape. Some of the popular advances include high capacity non-volatile memory (NVM), low latency switching fabric, and scale-out object storage architectures. Various web-scale applications have been modified to make use of these advances in hardware. Since conventional virtualization platforms provide legacy hardware interfaces to the guest operating systems, the applications cannot really take advantage of the hardware advancements. Hence, there arises a need to evolve the current virtualization platform to provide these benefits to the next generation of applications.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 2B and 2C show high level block diagrams of a host computer system configured in accordance with the present disclosure.

FIGS. 3A, 3B, and 3C illustrate a typical cycle of activity in the virtual infrastructure in accordance with the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
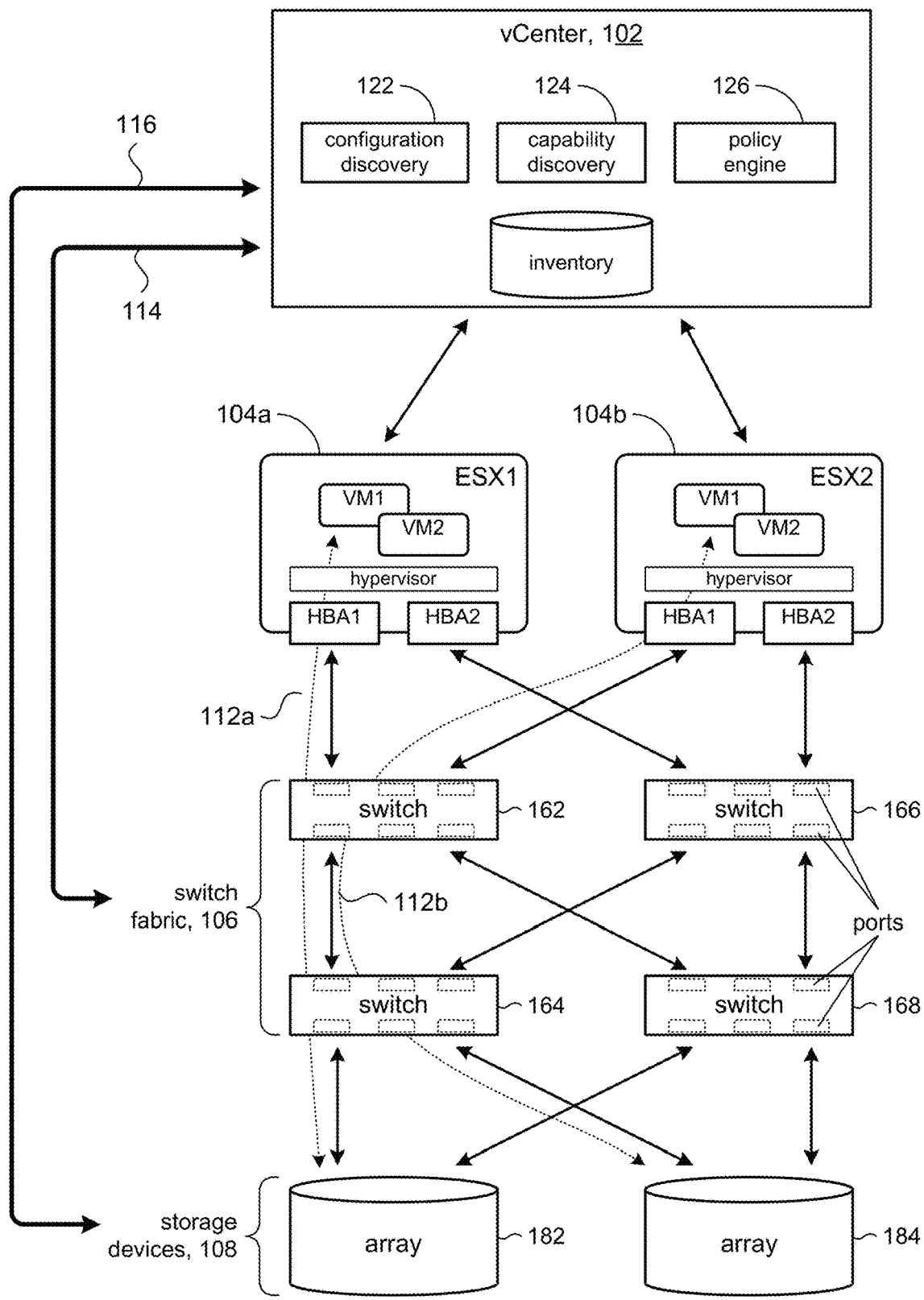
FIG. 1 shows a high level block diagram of a virtual machine environment in accordance with the present disclosure.

FIG. 1 illustrates a virtual machine infrastructure to provide an environment for virtual machines. The virtual machine infrastructure may include a management system 102 (e.g., the VMware® vCenter™ server) to provide the services of a centralized administrator to administer and otherwise manage virtual machines and host computer systems that host the virtual machines. In accordance with the present disclosure, the management system 102 may include, among other components, a storage monitoring service (SMS) comprising a configuration discovery module 122 and a capability discovery module 124, and a policy engine 126 (e.g., storage policy based management, SPBM) to provide policy management and policy enforcement). These components will be described in more detail below.

The virtual machine infrastructure may further include one or more physical host computer systems 104a, 104b for hosting virtual machines. For example, the VMware® ESX® hypervisor is a commercial virtualization platform that can execute on suitable computer hardware to run virtual machines. The hypervisor software may be referred to as the "VM kernel" or simply "kernel." Each host computer system 104a, 104b may include data channels that provide input/output (I/O) processing and connectivity to data storage. FIG. 1, for example, illustrates that the host computer systems 104a, 104b can be configured with host bus adapters (HBAs) for connection to the virtual infrastructure, namely a switch fabric 106. In accordance with the present disclosure, the host computer systems 104a, 104b may be configured to perform capability discovery, which will be explained in more detail below.

The switch fabric 106 may provide communication channels (e.g., 112a, 112b) between the host computer systems 104a, 104b and storage devices 108. Nodes 162, 164, 166, 168 comprising the switch fabric 106, each, may have several ports to provide connectivity to the host computer systems 104a, 104b (e.g., via the HBAs), among the nodes, and to the storage devices 108.

As will be understood herein, the notion of a "storage device" refers to a data store that the virtual machines "see." A storage device 108 may comprise any suitable configuration of physical devices, including, for example, individual storage disks, arrays of storage disks (e.g., 182, 184), and so on. In some implementations, the data storage architecture may constitute a portion of the switch fabric 106. Typical data storage configurations include storage area network (SAN) arrays such as fibre channel SAN arrays and iSCSI SAN arrays, Virtual Volume arrays, network attached storage (NAS) arrays, and the like.

The virtual machine infrastructure may include communication channels 114, 116. The management system 102 may communicate with the switch fabric 106 over communication channel 114 and with the storage devices 108 over communication channel 116. In some embodiments, the communication channels 112a, 112b may carry applications data generated by an application; e.g., between a virtual machines hosted on a host computer system (e.g., 104a) and a storage device (e.g., 182). Communication channels 112a, 112b are sometimes referred to as "in-band" channels. By comparison, the communication channels 114, 116 may carry data (e.g., metadata, control data) to configure and otherwise control the endpoints of the communication channel, instead of applications data. Communication channels 114, 116 are sometimes referred to as "out-of-band" channels.

In accordance with the present disclosure, the management system 102 may use in-band and out-of-band communications to gather information about the data devices that comprise the virtual machine infrastructure. For example, an in-band communication might include a host computer system (e.g., 104a) gathering information about a data device along a communication channel (e.g., 112a) and providing that information to the management system 102. As used herein, "data device" will be understood as referring to one of the data processing components in the virtual machine infrastructure, including for example but not limited to, physical devices such as HBAs in the host computer systems 104a, 104b, data switching nodes 162, 164, 166, and 168 in the switch fabric 106, the storage devices 108, and the like.

Figure 2A:
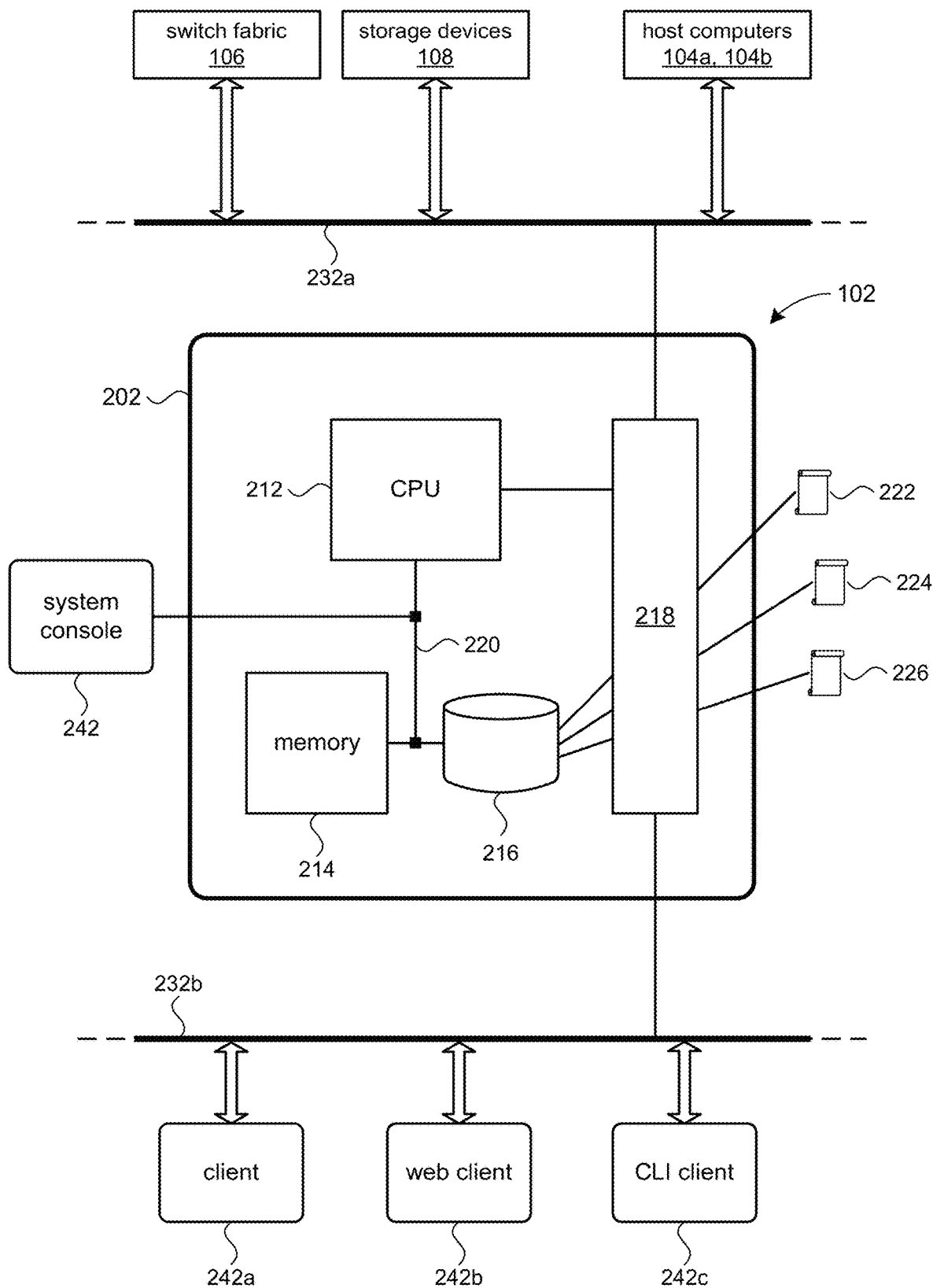
FIG. 2A shows a high level block diagram of a management system configured in accordance with the present disclosure.

Referring now to FIG. 2A, the management system 102 may be a computer system 202 that includes a central processing unit (CPU) 212 or other similar data processing component. The CPU 212 may be a single processor or a multiprocessor subsystem. The computer system 202 may include various memory components. For example, the memory components may include a volatile memory 214 (e.g., random access memory, RAM) and a data storage system 216. An internal bus 220 may interconnect the various components in computer system 202.

A communication interface 218 may be provided to support communication over a communication network 232a, such as a local area network (LAN), the Internet, and so on. In some embodiments, the communication interface 218 may support out-of-band communication channels 114, 116. The communication interface 218 may further support communication with the host computer systems (e.g., 104a, 104b), on the same network 232a or on a separate communication network.

The data storage system 216 may store the inventory of resources and capability information discovered in the virtual machine infrastructure. The data storage system 216 may comprise a non-transitory computer readable storage medium having stored thereon computer executable program code 222-226. The computer executable program code 222-226 may be executed by the CPU 212 to cause the CPU to perform actions in accordance with the present disclosure; e.g., FIGS. 3A-3C. For example, computer executable program code 222 may provide the functionality of the configuration discovery module 122, computer executable program code 224 may provide the functionality of the capability discovery module 124, and computer executable program code 226 may provide the functionality of the policy engine 126.

A user (e.g., system administrator) may communicate or otherwise interact with the computer system 202 via a system console 242. In some embodiments, the user may access the functionality of the management system 102 over a communication network 232b using a client 242a, a browser-based Web client 242b, a text-based command line interface 242c, or other suitable interface to manage the infrastructure.

Figure 2B:
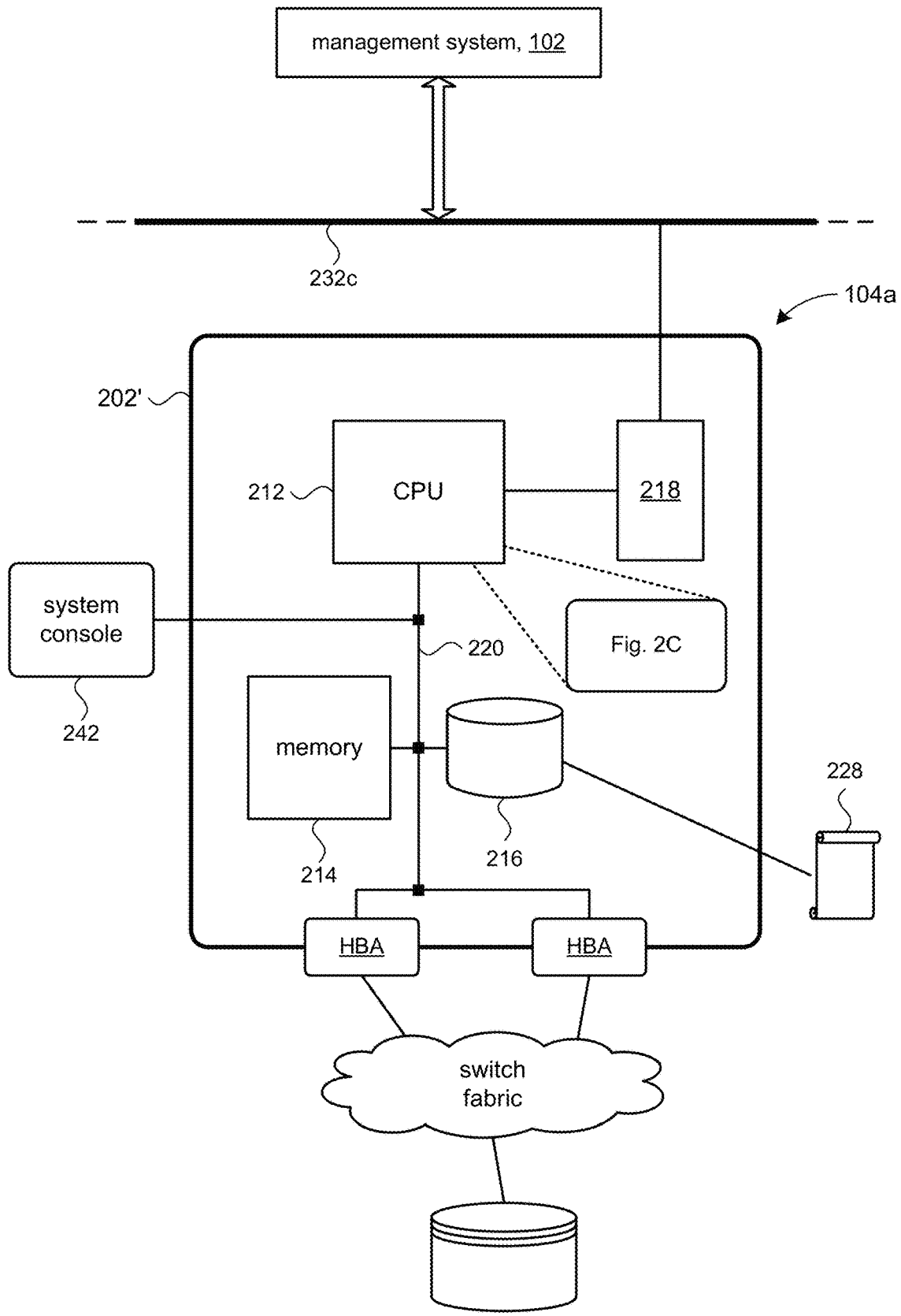

Referring now to FIGS. 2B and 2C, a typical host computer system (e.g., 104a) may comprise a computer system 202' having basically the same hardware components as shown in FIG. 2A. The computer system 202' may be connected to the management system 102 over a suitable communication network 232c; e.g., a local network, a direct connection between computer systems 202 and 202', etc. The computer system 202' may include HBAs for connection to a switch fabric. The data storage system 216 may include a hypervisor program 228 to provide a virtualization layer (FIG. 2C) for supporting virtual machines. Each virtual machine, in turn, may serve as a virtual hardware platform to support a guest operating system (guest OS) and one or more applications. The hypervisor program 228 may include a discovery services module for discovering configurations and capabilities of data devices in accordance with the present disclosure.

FIGS. 3A-3C depict an illustrative example of a typical cycle in the management of a virtual machine infrastructure by the management system 102 (FIG. 1) in accordance with the present disclosure. FIG. 3A represents discovery of the infrastructure. FIGS. 3B and 3C represent policy management. FIG. 3B represents how the discovered information can configure virtual machines. FIG. 3C represents how to migrate virtual machines in accordance with the present disclosure.

Referring first to FIG. 3A, at 302, the configuration discovery module 122 (FIG. 1) may discover the configuration of data devices in the infrastructure by receiving configuration information. For example, discovery may include receiving and storing identity information that identifies the data devices in the infrastructure, and connectivity information about the connectivity among the data devices. For data devices having several data ports (e.g., switches and storage arrays), the identity information may include identifying individual data ports and the connectivity information may identify connectivity with the individual data ports.

At 304, the capability discovery module 124 (FIG. 1) may discover capabilities of the devices in the infrastructure by receiving capability information. Capability discovery may be triggered at initialization time or upon detecting any changes in topology, configuration, or capability. Whereas the configuration information obtained at 302 may inform the management system 102 about what data devices are in the infrastructure and how they are interconnected, capability information obtained at 304 may inform the management system what capabilities those data devices can provide vis-à-vis how they perform their basic functionality, data handling services in addition to the their basic functionality, and the like. For example, a switch provides the basic functionality of data switching. However, the switch may have the capability of switching data between ports within a certain amount of time (latency); this represents an example of how the data switching functionality can be performed. The switch may provide the capability of performing data protection such as checksumming, encryption, and so on, which represent examples of data handling services in addition to the data switching functionality. Likewise, a storage device provides the basic functionality of storing and reading data; but, the storage device may be capable of performing a read operation with a guaranteed a maximum read latency of 50 mS, or may be capable of providing additional data handling services such as data protection, data backup, and so on. Other capabilities may include data handling services such as data encryption, data isolation, support for data integrity fields (DIF) or data integrity extensions (DIX), snapshot support, and so on. The capabilities of a data device, of course, will depend on the kind data device in question; e.g., HBA, switch, storage device, etc.

In various embodiments, the management system 102 may obtain the configuration information (at 302) and the capability information (at 304) via out-of-band channels 114 and 116. As shown in FIG. 1, in some embodiments, the management server 102 may obtain information about the switch fabric 106 over out-of-band channel 114 in accordance with some industry standards, such as for example, the storage management initiative specification (SMI-S) using a common information model (CIM) based client. Another standard that can be used is the simple network management protocol (SNMP), and so on. Similarly, the management server 102 may obtain the configuration and capability information for some storage devices via out-of-band channel 116 using, for example, the VMware® vSphere® API for Storage Awareness (VASA) framework.

Figure 4:
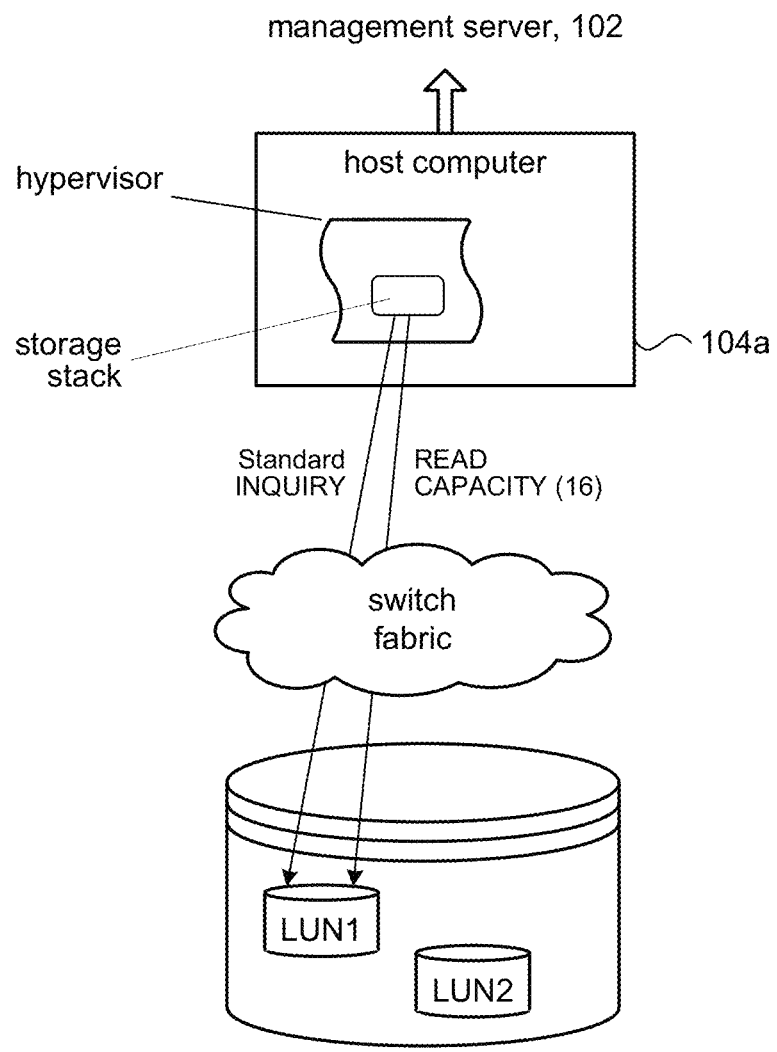
FIG. 4 illustrates an example of discovery by a host computer system in accordance with the present disclosure.

In some embodiments, each host computer system (e.g., 104a, 104b) may perform the discovery of configuration information and capability information, rather than the management system 102. The host computer system may maintain an inventory of HBAs, switch ports, etc. The inventory maintained by the host computer system may then be provided to the management system 102; e.g., using a "hostd" remote procedure call (RPC). Referring to FIG. 4, for example, when a storage stack component in the hypervisor of host computer system 104a discovers a storage device (e.g., LUN1), the storage stack may send a Standard SCSI INQUIRY command to the LUN. If the response from the LUN indicates that it supports data protection, then the storage stack component may issue a SCSI READ CAPACITY (16) to the LUN to obtain capability information indicative of the type of data protection supported by the LUN. The host computer system 104a may then push the configuration and capability information it has obtained to the management server 102; e.g., to be handled respectively by the configuration discovery module 122 and capability discovery module 124.

Likewise, the host computer systems 104a, 104b may gather the configuration and capability information for their respective HBAs, and push that information up to the management server 102. For example, application programming interfaces (APIs) provided in the hypervisor of the host computer system can interface with driver software in the HBA to obtain information about the HBA's capabilities.

Figure 5:
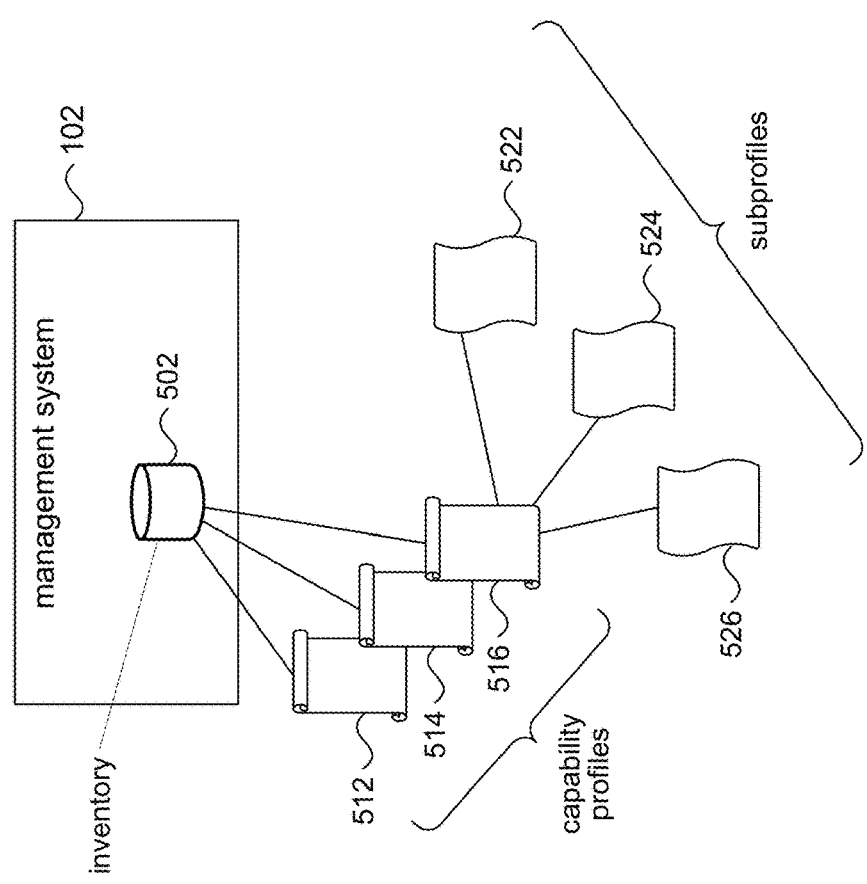
FIG. 5 illustrates an example of an inventory in the management system in accordance with the present disclosure.

The management system 102 may compile an inventory of information that identifies the data devices discovered in the virtual machine infrastructure. In some embodiments, for example, a capability profile may be created for each data device. Referring to FIG. 5, for example, the management system 102 may maintain an inventory of data devices (e.g., in a data store 502) comprising capability profiles 512, 514, 516 for each discovered data device. Each capability profile (e.g., 516), in turn, may comprise one or more subprofiles 522, 524, 526 describing a particular capability of its corresponding data device. A subprofile may indicate a performance capability of the corresponding data device, such as read latency, or data switching latency, and so on; e.g., a subprofile may indicate a storage device can guarantee READ completing in 50 mS. Other profiles may indicate additional data handling service capabilities such as, for example, data integrity, data encryption, data isolation, etc.; e.g., a subprofile may indicate a data device can support DIF/DIX ("Type 1," "Type 3," etc.) data protection, or that snapshot processing is supported (e.g., on an Hourly basis, a Daily basis, etc.), and so on.

In some embodiments, the host computer system (e.g., 104a) may assimilate, at 306, the configuration information and capability information of data devices that it has discovered to define one or more composite data devices ("OS devices"), which the host computer system can provide to the management system 102 for inclusion in its inventory. In some embodiments, an OS device may be defined in terms of, or otherwise represents, a discovered LUN and an HBA in the host computer system that can access the LUN. In some embodiments, an OS device may be defined for each discovered LUN that the host computer system can reach.

Figure 6:
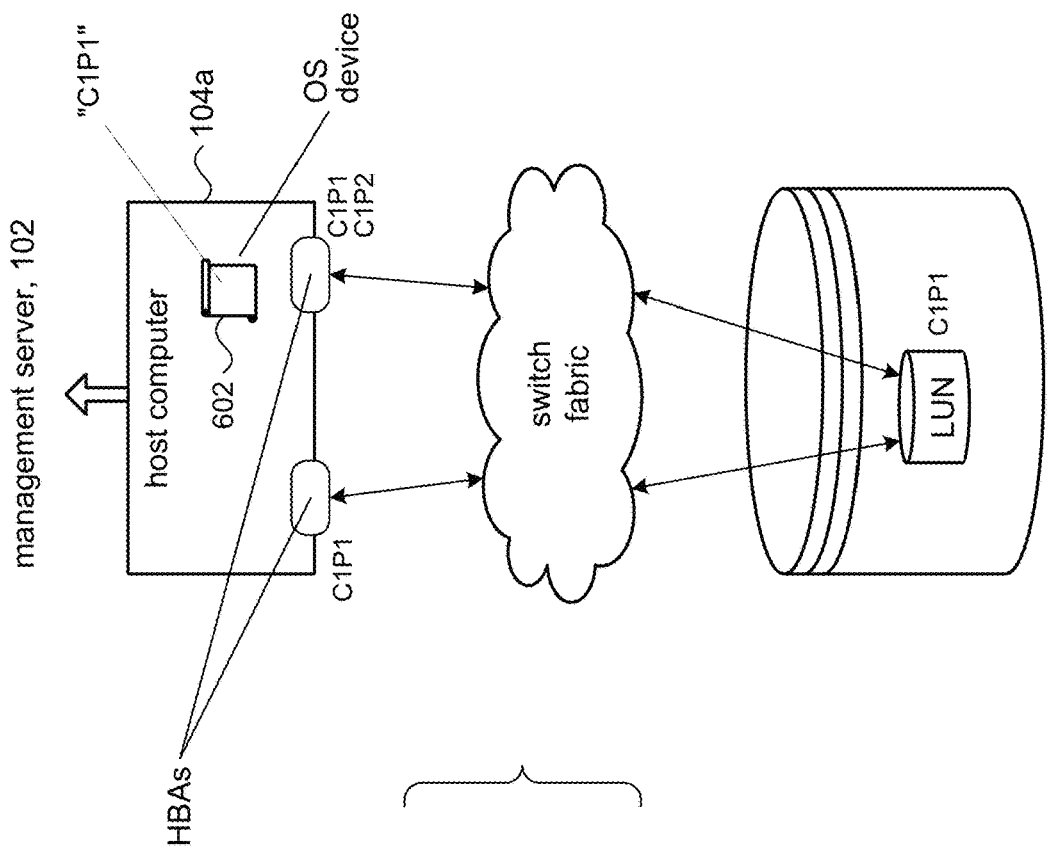
FIGS. 6 and 7 illustrate examples of defining an OS device in accordance with the present disclosure.

The capability profile for an OS device may be defined based on capabilities that are common to the data devices comprising that OS device. Referring to FIG. 6, for example, the host computer system 104a may define an OS device 602 to represent a discovered LUN. The capabilities of the OS device 602 may be determined based on capabilities discovered of the HBA(s) that can access that LUN and on capabilities discovered of the LUN itself. Consider, for example, the following capability discovery scenario illustrated in FIG. 6, where the HBAs are capable of supporting data integrity (e.g., call this capability, C1). As the figure illustrates, one HBA can support Type 1 data integrity protection (e.g., call this property P1 of the capability) and another HBA can support Type 3 protection (e.g., call this property P2) in addition to Type 1 protection. Suppose the host computer system discovered that the LUN can support Type 1 data integrity, namely C1P1. The host computer system 104a may define an OS device (e.g., 602) representative of the LUN that has a capability profile which includes a subprofile of C1P1. Although there is a communication channel to the LUN involving an HBA that can provide capability C1P2, the LUN in the example in FIG. 6 can only support C1P1 and so the host computer system 104a may ignore the C1P2 capability that the HBA can provide. A host computer system can therefore define an OS device that has a guaranteed capability, enabling the management system 102 to define virtual machines with predictable capabilities. The management system 102 may pull or otherwise obtain information about the OS device into its inventory, including an identification of the host computer system which contains that OS device.

Figure 7:
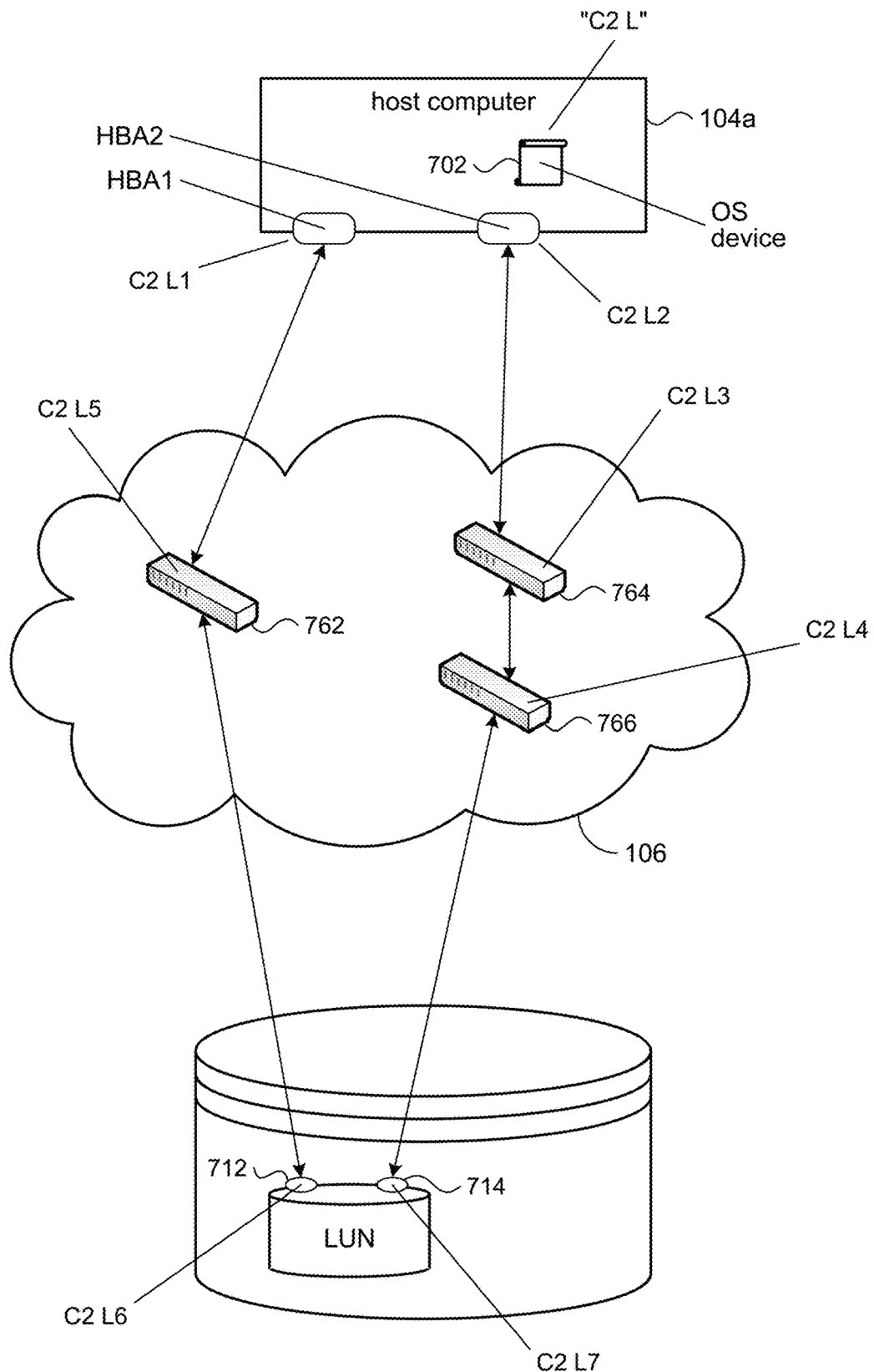

In some embodiments, the capability profile for an OS device may include a latency subprofile. The latency may be determined based on the individual latencies of each data device represented in the OS device. Referring to FIG. 7, for example, the latency of OS device 702 may be determined based on the discovered latencies illustrated in the figure. We can assume without loss of generality, that all the discovered elements (data devices, ports, etc.) support the same capability, e.g., capability C2. The latency may be determined for each HBA. For example, the latency seen at the port of HBA1 may be determined by summing the individual data device latencies:

$$HBA1 port latency = L1+L5+L6,$$

where
L1 is the latency in HBA1,
L5 is the latency in switch 762, and
L6 is the latency in data port 712 of the LUN.
Though the LUN provides capability C2, its data ports 712, 714 may have different latencies.

Likewise, the latency seen at the port of HBA2 may be determined by computing:

$$HBA2 port latency = L2+L3+L4+L7,$$

where
L2 is the latency in HBA2,
L3 and L4 are latencies in switches 764 and 766 respectively, and
L7 is the latency in data port 714 of the LUN.

The latency can then be deemed to be the larger of the two computed latencies. This can be used to represent a guaranteed maximum latency for I/Os from a virtual machine hosted on the host computer system 104a to the LUN. It will be understood that similar determinations may be made for additional LUNs accessible by host computer system 104a.

In some embodiments, the latency may further include latency(ies) in the hypervisor itself to improve accuracy. For example, when an application running on a virtual machine issues an I/O request, the guest OS receives the I/O request and passes it to the hypervisor, where I/O drivers in the guest OS access the virtual hardware to process the I/O request. There will be a latency in the hypervisor before the I/O commands from the I/O request are communicated to the HBA. The OS device can include this "hypervisor latency" to provide a more accurate measure of the actual latency that an application may experience.

In some embodiments, the latencies can be categorized. The categories may be qualitative; e.g., High, Medium, Low, etc. For example, the capability profile for the LUN shown in FIG. 7 may categorize the HBA1 port latency and the HBA2 port latency into different categories; e.g., by comparing against threshold values for the categories. This can be used to define two OS devices for the same LUN, but with different capabilities, giving the management system 102 some flexibility in defining virtual machines. This notion can be extended to data handling services (e.g., data protection, data encryption, etc.), in addition to latencies.

Referring now to FIG. 3B, in accordance with the present disclosure, policy management may involve the use of discovered configuration information and capability information to create virtual machines (VM provisioning) on the management server 102. At 312, a system administrator may define a virtual machine (VM) policy profile. The VM policy profile addresses the notion of "what a VM needs to have."

The VM policy profile may define VM service requirements that an application running on a VM may require. For example, "data integrity as a service" typically refers to honoring a checksum generated by the application for its I/O as the checksum and its data traverse the heterogeneous hardware of the virtual infrastructure to its target data storage destination. Each of the data devices in the path of the I/O may perform checksum validation to flag data corruption before it is written to a disk. Lack of data integrity support in the virtualization platform can make the physical-to-virtual transition a difficult task for certain time-sensitive database applications, for example, so it can be an important consideration that the VM policy profile be able to specify a virtual machine in terms of such capabilities. An example of another service may be generally referred to as "latency quality of service, QOS," which calls for honoring I/O completion requirements for an application with a maximum latency. It will be appreciated that other services may be supported in the VM policy profile.

In a particular embodiment, for example, VM policy profiles may be categorized as Gold profile, Silver profile, and Bronze profile; although other categories are certainly possible. An example of a Gold profile may specify the following capabilities:
Subprofile 1
Capability 11: read latency≤50 mS
Capability 12: write latency≤70 mS
Subprofile 2
Capability 21: DIF support After creating a VM policy profile at 312, the system administrator may save the VM policy profile in a data store of profiles for later deployment. The system administrator may create additional VM policy profiles.

At 314, the policy engine 126 may compare the capability requirements set forth in a given VM policy profile (e.g., one of the VM policy profiles from among the VM policy profiles created at 312), and identify data devices based on their respective capability information relative to the requirements set forth in the VM policy profile. For example, the policy engine 126 may go through its inventory of OS devices to find an OS device that matches the capabilities in the VM policy profile; in other words is compliant with the VM policy profile. Thus, using the example above, the policy engine 126 may look for an OS device whose capability profile indicates a read latency performance of at most of 50 mS, a write latency performance of at most 70 mS, and support for DIF type data integrity. In some embodiments, the VM policy profile may be viewed as specifying a minimum capability. Thus, for example, an OS device that supports DIX data integrity in addition to DIF integrity may be deemed as meeting (or is compliant with) the capability requirements of the Gold policy profile. The policy engine 126 may then store or otherwise associate the OS device that matches the Gold policy profile to create a virtual machine. The provisioning of a virtual machine based on the capabilities of its constituent data devices (e.g., HBA, switch fabric, storage device in storage array) defines not only a physical topology of the data devices (e.g., which HBA port is connected to which switch port), but also defines a "capability topology" that specifies the connection of data devices in terms of the capabilities that they can provide. The VM is now provisioned with data devices that are compliant with the given VM policy profile.

At 316, the user may use the management server 102 to power on the virtual machine created at 314. At this point, the OS device that is associated with the virtual machine is known (per 314). Likewise, the host computer system that defined the OS device is known (per 306, FIG. 3A). Accordingly, the management server 102 may deploy the OS device on the host computer system to power on a virtual machine.

Referring now to FIG. 3C, in accordance with the present disclosure, policy management may further include using the configuration information and capability information (e.g., discovered pursuant to FIG. 3A) to migrate virtual machines. In some embodiments, a virtual machine running on a given host computer system may be migrated to another host computer system. In some embodiments, the virtual storage represented by the OS device may be migrated to different physical storage. In some embodiments, migration can be performed on both the virtual machine and the virtual storage. Accordingly, at 322 a system administrator or other user on the management system 102 may initiate a migration.

At 324, the policy engine 126 may identify the infrastructure components involved in the migration. For example, in the case of virtual machine migration, the management system 102 may look into its inventory to identify a suitable target host computer system on which to migrate the virtual machine (at 326). The policy engine 126 may identify a new end-to-end communication channel, comprising a target host computer system having a suitable HBA that can support an end-to-end communication channel to the current storage device (e.g., LUN) on which the virtual machine's data is stored. The combined capability of the new end-to-end communication channel should be at least as good as the capability of the communication channel of the present OS device in order to honor the VM policy profile of the virtual machine. If a suitable target host computer system can be identified, then the management system 102 can migrate the virtual machine at 326. If a target host computer system can not be identified, then the management system 102 may indicate a suitable error to the user.

In some embodiments, the policy engine 126 may enforce policy (policy enforcement), in addition to providing for the policy management discussed above. In accordance with the present disclosure, when a VM is provisioned over a policy-compliant virtual environment, the policy engine 126 may institute policy enforcement when the virtual machine is powered on. At a high level, policy enforcement can be achieved in several steps after the guest OS generates and issues an I/O command that specifies a service requirement, using for example I/O hints or tags in the I/O command. In accordance with the present disclosure, service requirement policies (e.g., data integrity, latency QOS, etc.) can be enforced on a per guest OS and per I/O command basis. Thus, an I/O command from a guest OS on virtual machine VM1 may be enforced according to policies that are different from I/O commands that issue from a guest OS on another virtual machine VM2. Thus, although VM1 and VM2 may share common physical hardware (e.g., HBA, switch fabric, storage array), such physical hardware may enforce different policies for different I/O commands.

The following general steps occur to enforce policies in accordance with the present disclosure:
  A GOS I/O command is generated in an application executing on the GOS.
  The I/O command is routed to a policy-complaint path through an HBA, one or more switches, and a target storage array. Furthermore, individual devices or layers along the path can FAIL the I/O command immediately if the device or layer is service-incapable or service mishandling (e.g. data corruption for data integrity service) is detected.
  In some embodiments, the VM kernel may include a driver to translate (if necessary), a protocol-specific and fabric-understood hint so that appropriate services can be applied for the command during transport.
  For incoming I/O traffic at the target storage array, a driver at the target storage array should understand the protocol-specific hint and translate it into a suitable array-understood notation such that the I/O command can be processed compliantly by the target storage device in the target storage array.
  After the I/O command is completed by array, target driver needs to retain the hint from incoming traffic and post it into returning traffic.
  On the return path, individual layers can verify result and FAIL the I/O command for any compliance violation.
  Failures may be stored for analysis to assess when one or more criteria have been met to initiate corrective action. For example, if a failure count exceeds a predefined threshold within a specified window set, a self-correction process can kick in to degrade or otherwise change the capability for a data device (e.g., HBA). Criteria (e.g., frequency of failures) may be defined to determine when to trigger capability discovery to refresh the stored capabilities of the data devices in the infrastructure.
  Before capability discovery is completed, IOs can be FAIL'd by nodes along the end-to-end path due to recent capability degradation. Furthermore, it might escalate to path migration or vMotion.

Figure 8:
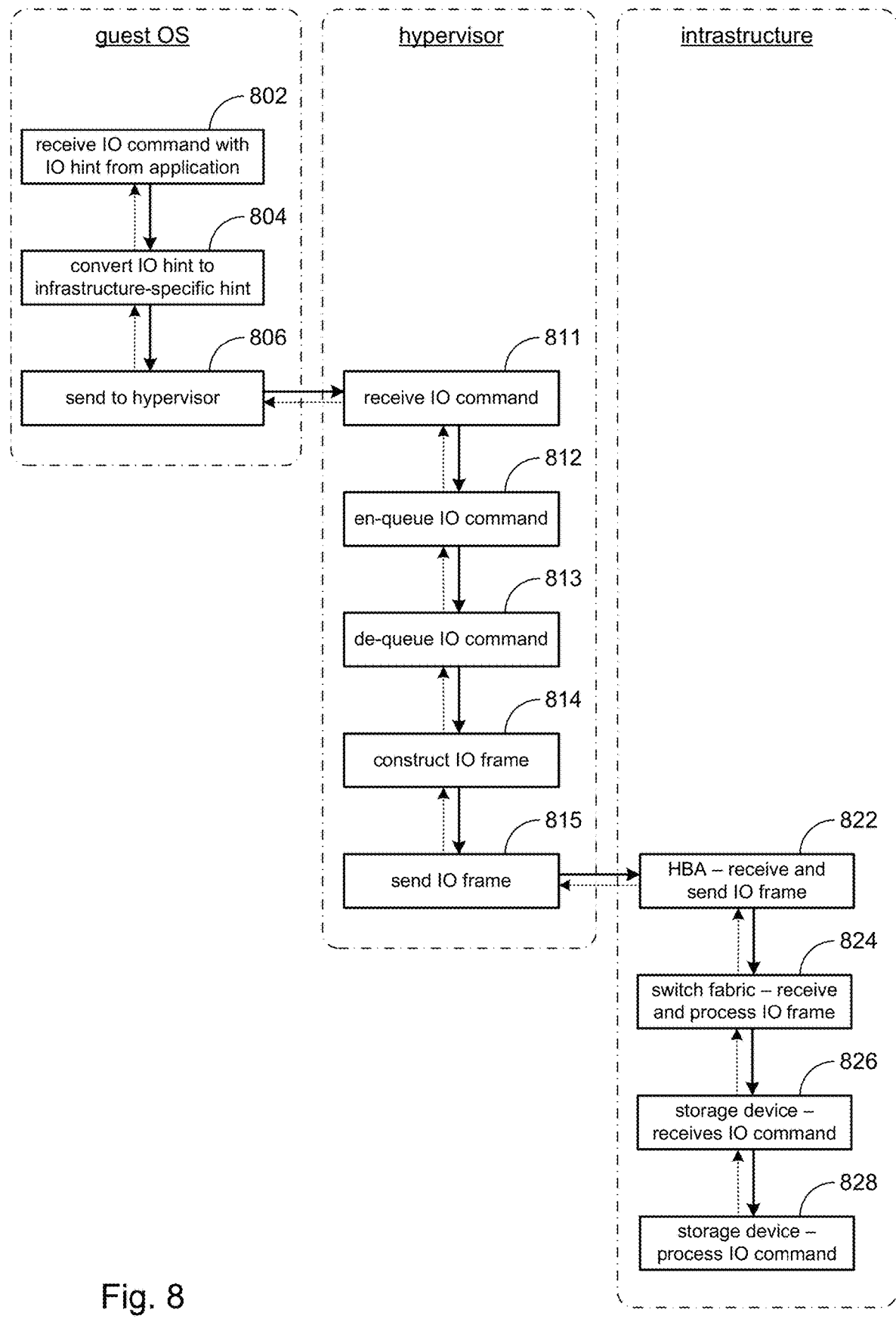
FIG. 8 illustrates the flow of an I/O command originating from an application running on a virtual machine in accordance with the present disclosure.

Referring now to FIG. 8, policy enforcement in accordance with an embodiment of the present disclosure will be discussed. Enforcement of the capabilities of the virtual machine may occur in the guest OS, in the routing of the I/O by the hypervisor (VM kernel), and by the tagging of the I/O by the hypervisor to enforce those capabilities in the switch fabric and the physical storage.

At 802, the guest OS executing on a virtual machine (VM) may receive an I/O command with a hint from an application that is executing on the guest OS. For example, suppose an application opens a device for I/O. The application may generate an I/O command for READ or WRITE, and indicate a latency QOS hint. In some embodiments, the I/O hint may be provided as an argument to the I/O command. Consider the following system library call, for example:
  write(fd, "test string", QOS_LATENCY)
where
  fd is a file descriptor, and
  QOS_LATENCY is a #define'd constant that specifies a latency time (the 'hint').

At 804, a device driver in the guest OS may receive the I/O command and convert it to an I/O command format that is specific to the hypervisor, including for example converting the I/O hint into a format that depends on the conventions and definitions used in the virtual machine infrastructure. The converted I/O command may then be sent to the hypervisor at 806.

In the example above, the application has provided the I/O hint or tag to specify a certain service such as data integrity checking or latency QOS requirement, for example. In some embodiments, there may be legacy applications that do not provide for such hints or tags with their I/O. Accordingly, in some embodiments, the VM may provide a software filter that can inject a suitable hint or tag to request a service. For example, if the guest OS uses SCSI, the VM may provide a customized SCSI device driver for the guest OS. When the customized SCSI device driver receives the legacy I/O command from the guest OS, the device driver can determine what kind of service request to use and inject a suitable hint into the I/O command before being sent to the hypervisor at 806.

At 811, the hypervisor may receive and process the I/O command through several layers of a storage stack. In some embodiments, for example, this may happen in a vSCSI layer. Processing may include the hypervisor selecting a qualified device path to handle the I/O command to meet the requirement of the I/O hint. In some embodiments, the hypervisor may implement prioritized I/O queues in order to support different latency QOS requirements. Thus, if the I/O hint specifies a given latency, the hypervisor at 812 may queue the I/O command on a suitably prioritized I/O queue for the given latency. At 813, the hypervisor will de-queue a previously queued I/O command according to the priority of the I/O queues. This aspect of the present disclosure will be discussed in more detail below.

At 814, the hypervisor may construct an I/O frame from the I/O command that is specific to the protocol used by the switch frame. The I/O hint may also be translated according to an applicable protocol; e.g., the I/O hint may be stored in the CS_CTL/Priority Header field in a fiber channel protocol. At 815, the hypervisor may send the IO frame to the HBA, which can send the received frame (at 822) into the switch fabric.

At 824, switches in the switch fabric can interpret the I/O hint in the I/O frame in order to prioritize the switching of the I/O frame accordingly. At 826, after the I/O frame reaches the target storage device in the storage array, a driver in the storage device can translate the I/O hint contained in the I/O frame into a suitable hinting mechanism for proper handling by the storage device. At 828, the storage device can process the I/O command, and depending on the I/O hint, the processing may be performed within a certain time and/or with additional servicing of data (e.g., data protection, data encryption, and so on).

When the storage device completes the I/O command, the storage device may retain the I/O hint in the completion path (dashed lines in FIG. 8). The storage device may return an I/O response (I/O complete command). The return traffic of the I/O response can be processed accordingly. When the I/O response reaches the HBA, processing of the I/O response continues through the device driver in the hypervisor, the guest OS, and to the application.

The discussion will now turn to policy enforcement, error handling, and translations in the context of specific services; e.g., data integrity checking and latency QOS. Generally, when the hint for a service cannot be provided, such failures in policy enforcement may cause the I/O command to terminate immediately. In some embodiments, after some number of policy enforcement failures occurs, notifications or remedial actions may be performed.

Figure 9A:
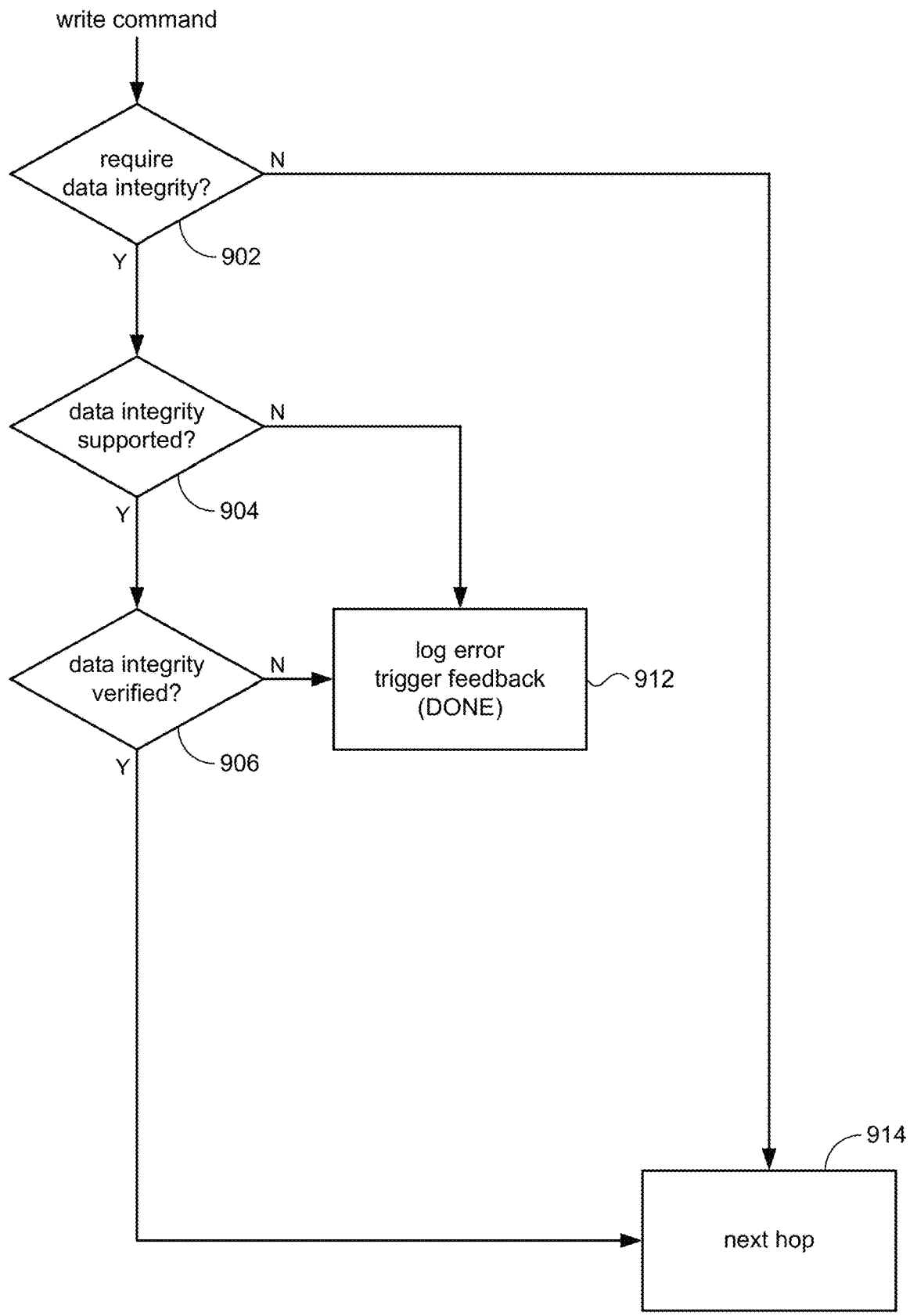
FIGS. 9A and 9B illustrate examples of data integrity enforcement in accordance with the present disclosure.
Figure 9B:
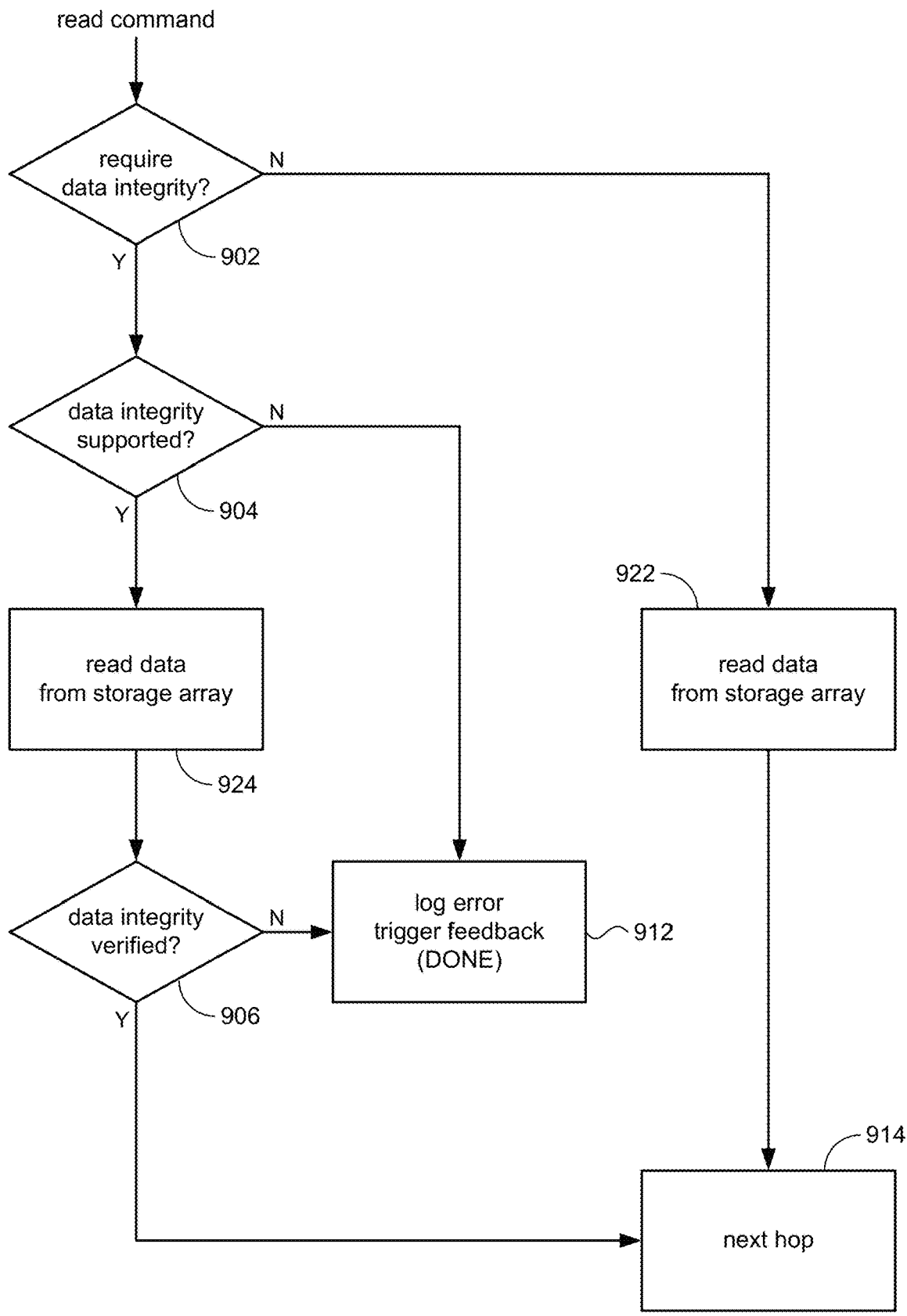

FIGS. 9A and 9B illustrate examples of data integrity enforcement in accordance with the present disclosure. Data integrity may include checksum algorithms (e.g., IP checksum, T10 CRC, etc.) or other suitable computations on the data to ensure against data corruption in the data being read or written. Data integrity checking may occur in either direction: (1) on data from an application to be written to storage; or (2) on data read from storage by an application. Data integrity checking may occur at any command receiving node (layer, data device) such as in the HBA, in the switch, in the storage array, etc. In accordance with the present disclosure, data integrity checking may be enforced on a per I/O command basis. In other words, some I/O commands may require data integrity enforcement (specified service requirement), while other I/O commands may not require data integrity enforcement.

FIG. 9A illustrates an example of data integrity enforcement for a write operation in accordance with the present disclosure. At 902, in response to receiving an I/O command, if the I/O command does not require (specify) some form of data integrity checking, then processing may continue from the receiving node to the next hop (node, layer). Thus, at 914 the I/O command may be passed on to the next layer in the I/O path. The I/O path may be defined by the data devices (e.g., HBA, fabric, etc.) between the host computer system (e.g., 104a, FIG. 1) and the target storage device. For example, if an HBA receives an I/O command that does not require data integrity checking, then the HBA may send the I/O command into the next layer in the I/O path; e.g., the switch.

Continuing with 902, if the I/O command requires (specifies) data integrity checking, then at 904 the node that receives the I/O command determines whether it can provide or otherwise support the required data integrity checking. If the receiving node cannot provide for the required data integrity checking (enforcement failure), then in accordance with the present disclosure, the I/O command immediately fails and the receiving node may return an error response or otherwise flag a suitable error indication to the sender of the I/O command. The error response may indicate that the receiving node (data device) in some way has failed to comply with the service requirement of the I/O command; in this case, the receiving node cannot provide the required data integrity support. Processing proceeds to 912 where error logging may be performed to log the specifics of the error; e.g. identity of the receiving node, required data integrity checking, etc. Processing of the I/O command may then terminate.

Continuing with 904, if the receiving node can provide or otherwise support the required data integrity checking, then at 906 the receiving node performs the required data integrity check; for example, the receiving node may make a checksum computation. If the data integrity check fails, then in accordance with the present disclosure, the I/O command immediately fails and the receiving node may return an error response or otherwise flag a suitable error indication to the sender of the I/O command, indicating that the I/O command has failed and has not completed because the receiving node failed the data integrity check. Processing proceeds to 922 where error logging may be performed to log the specifics of the error; e.g. identity of the receiving node, nature of the failure of data integrity check, etc. Processing of the I/O command may then terminate.

Continuing with 906, if the data integrity is verified, then processing may continue from the receiving node to the next hop (node, layer). Accordingly, at 914 the I/O command may be passed on to the next layer in the I/O path.

FIG. 9B illustrates an example of data integrity enforcement for a read operation in accordance with the present disclosure. Processing at 902 and 904 are as described above, including the error handling. If data integrity is not required, then processing proceeds from 902 to 922 where data is read from the storage array. Processing may then continue with the next hop at 914, where the read data proceeds on a return path to the application.

Continuing from 904, if data integrity is required ("Y" from 902) and the device supports the required data integrity ("Y" from 904), then we know that data read from the storage array (at 924) will be subject to data integrity checking Processing may continue from 924 to 906 where data integrity may be verified. Error processing, e.g., because data integrity is required but not supported (904) or the verification failed (906), can be handled at 912 as described above.

Figure 10:
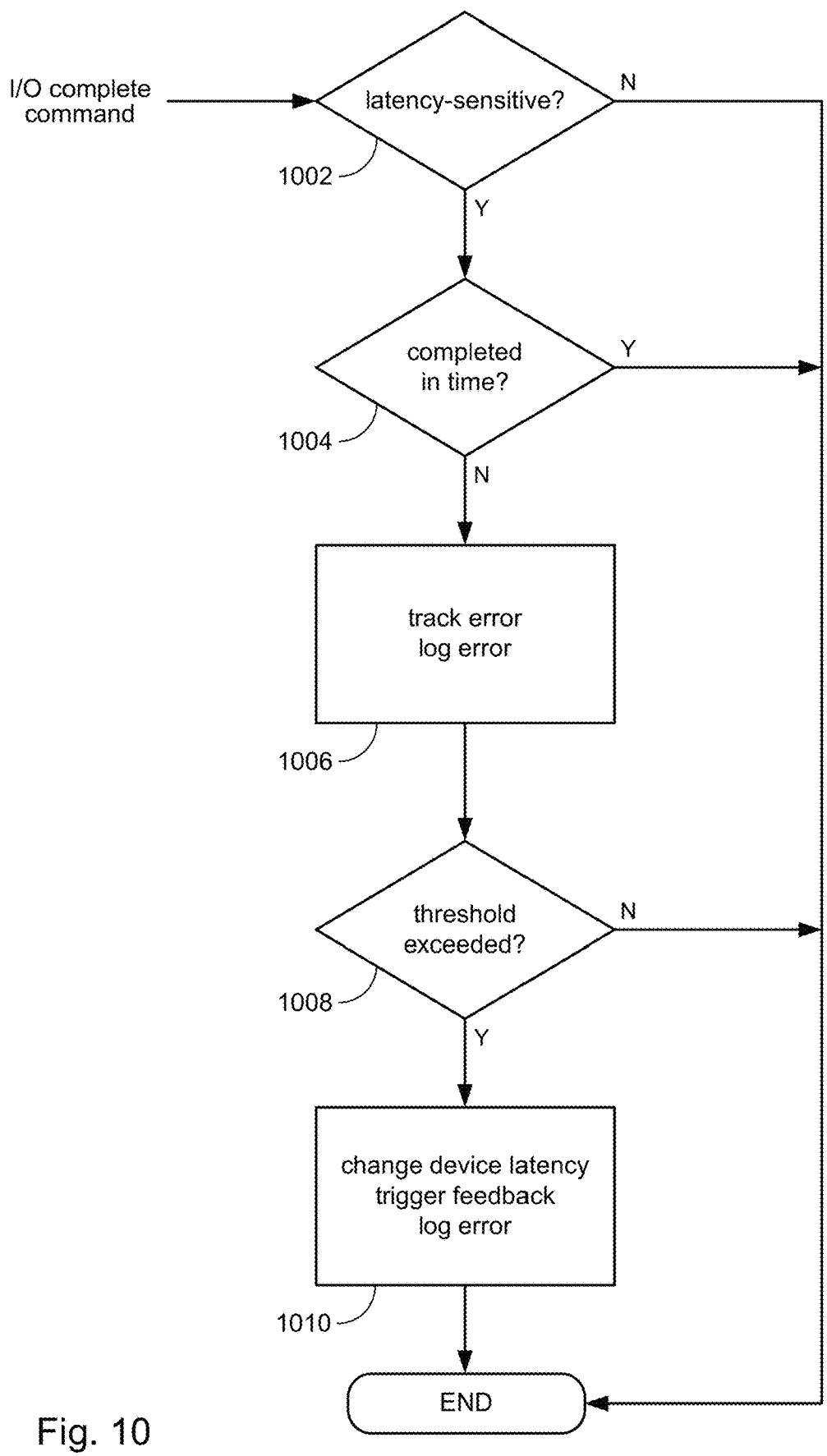
FIG. 10 describes an example of latency enforcement in accordance with the present disclosure.

FIG. 10 describes an example of latency QOS enforcement in accordance with the present disclosure. An I/O command may specify an expected completion time for completing the I/O operation. In some embodiments, the completion time may refer to maximum completion time. The following command structure expressed in pseudo-code may be used in some embodiments to enforce latency QOS requirements:

```
Command {
        conventional I/O command details
        ServicePolicy servicePolicy;
        Time ExpectedCompletionTime;
}
``` where servicePolicy is an instance of a ServicePolicy object that specifies a service policy, ExpectedCompletionTime is an instance of a Time object that specifies a latency time.

In some embodiments, the VM kernel may track individual I/O commands issued by guest OS's, which specify an expected completion time parameter; such as illustrated in the example pseudo-code above. In particular, the kernel may monitor the time it takes to complete a given I/O command.

Referring to FIG. 10, at 1002, in response to receiving an I/O complete command, the VM kernel may determine whether the corresponding I/O command included an expected completion time. For example, when a read or write command is executed, the storage array may send a suitable completion return command (I/O complete command) when the storage array completes the command. The kernel can match the completion return command against a list of pending I/O commands to identify the corresponding read or write command. If the I/O command did not include an expected completion time, the kernel may simply forward the I/O completion command to the guest OS that issued the corresponding I/O command, and conclude processing for that I/O command.

Continuing with 1002, if the I/O command specified an expected completion time, then at 1004, the VM kernel may determine whether the I/O completed within the time specified. If the I/O command completed within the allowed expected completion time, the VM kernel may simply forward the I/O completion command to the guest OS that issued the corresponding I/O command, and conclude processing for that I/O command.

Continuing with 1004, if the I/O command did not complete the I/O command within the expected completion time (enforcement failure), the VM kernel may track the error at 1006. The kernel can trace the I/O to a specific path, and thus identify the participating port on the data device (e.g., HBA port, switch port, target storage array port). In some embodiments, for example, a device counter may be provided for each data device (or in some embodiments, for each port of a data device) and incremented each time the actual I/O completion time exceeds (violates) the expected completion time. Actual turnaround times may be recorded for each device, and so on. The kernel may also log an error to record the enforcement failure; e.g., write to a log file, send an error to a system console, trigger an alarm, etc.

At 1008, if one of the device counters exceeds a predefined threshold within a specified window set, the VM kernel may take certain corrective actions. In some embodiments, each device counter may have a corresponding threshold value. In other embodiments, a single threshold value may be used for all the device counters. In other embodiments, different threshold values may be used for different categories of devices (e.g., HBA's, switches, etc.), and so on.

Corrective actions may include the VM kernel updating the capability profiles of devices. For example, the kernel may updated the I/O latency value of a device based on the actual turnaround times measured by the kernel. A device may be downgraded; e.g., a device categorized has High-Speed may be re-characterized as Medium-Speed. The kernel may disable latency QOS support capability in the capability profile of a device, and so on. The kernel may trigger capability discovery, and so on.

The VM kernel may write to log file to record the performance of the devices over a span of time. Performance reports may be generated using the latency data collected for each device. An alarm may be triggered to alert a system administrator, and so on.

Figure 11:
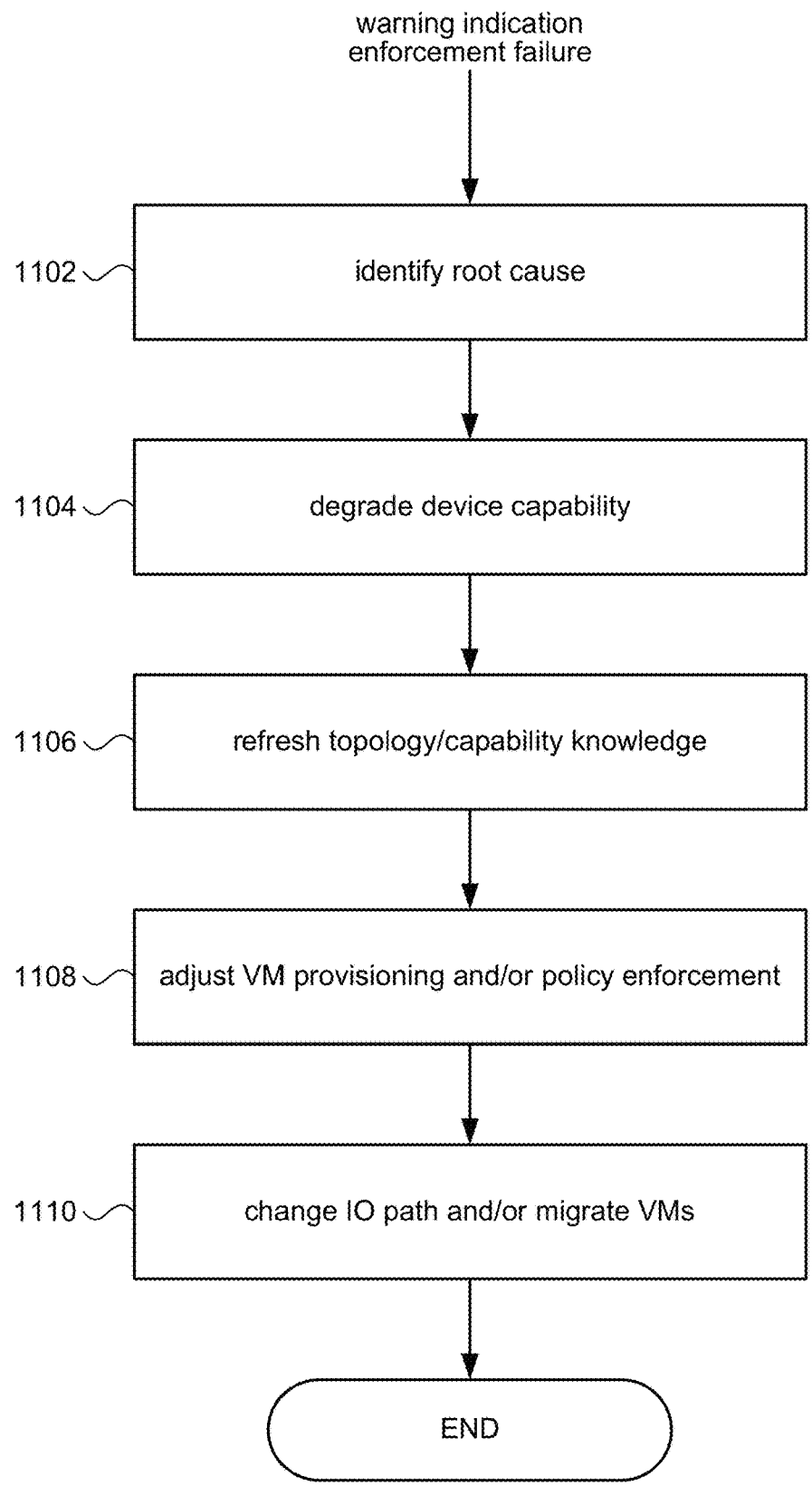
FIG. 11 shows an example of feedback handling in accordance with the present disclosure.

FIG. 11 shows an example of feedback handling in accordance with the present disclosure responsive to detecting a warning or other indication of an enforcement failure. In some embodiments, for example, the policy engine 126 may access various error logs to assess whether to activate corrective measures. For example, data collected for data integrity violations may be tracked. The data may be tracked so that when a threshold number of data integrity enforcement failures has been exceeded, the management system 102 may initiate action. The data may be used to identify certain patterns of enforcement failures as the basis for initiating action; e.g., a given device that consistently exhibits data integrity violations at 3 AM for a period of one hour may indicate some external activity that should be investigated.

At 1102, the first course of action may be to identify a root cause. This may include using expert systems, heuristics, data analytical techniques, and so on. At 1104, based on a root cause identified at 1102, corrective action may be taken to update the capabilities of a device to reflect actual measures of device performance collected over time. For example, if an HBA has failed to provide valid data integrity checks for some period of time or after some number of failures, the VM kernel may degrade the capabilities of the HBA from having data integrity checking capability to not having data integrity checking capability; e.g., by updating the capability profile (FIG. 5) for that HBA.

At 1106, the configuration discovery 122 and the capability discovery 124 may refresh the capabilities of the data devices in the inventory (FIG. 5). For example, they may trigger another cycle of discovery and update the "capability topology" of the virtual machine infrastructure to reflect the updated capabilities of the constituent data devices.

At 1108, VM provisioning and/or policy enforcement may be adjusted with respect to the new environment. For example, the policy engine 126 may determine that none of the data devices in the infrastructure can support data integrity checking and declare affected existing VMs as being non-compliant.

At 1110, the policy engine 126 may trigger an alarm that may cause an autonomous migration of one or more virtual machines to other physical host computer systems 104*a*, 104*b* (e.g., vMotion), migration of the storage arrays (e.g., storage vMotion), and so on.

Figure 12:
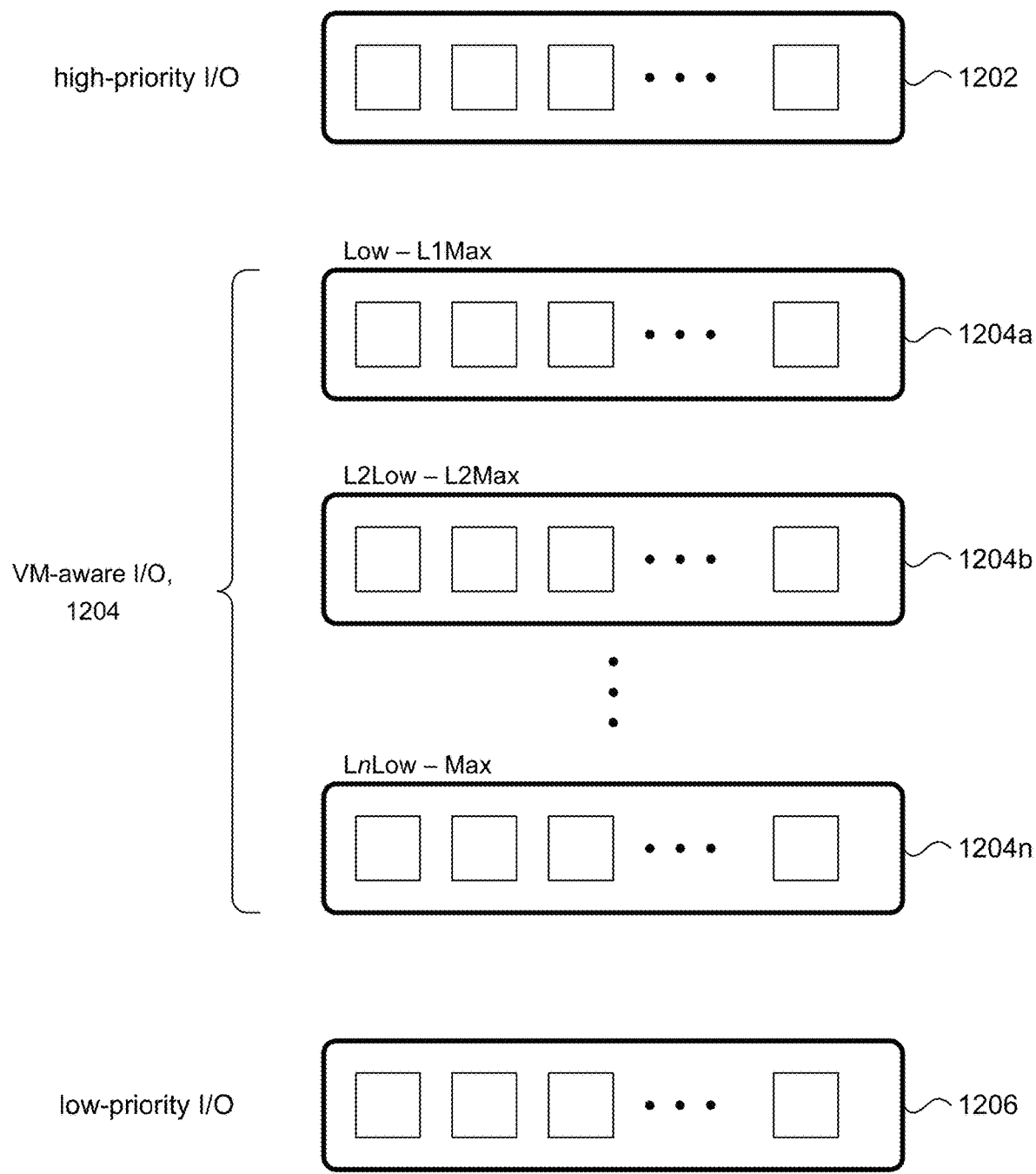
FIG. 12 illustrates an example of an I/O queue structure in accordance with the present disclosure.

FIG. 12 illustrates an example of an I/O queue structure that the VM kernel may provide, in accordance with the present disclosure. The kernel receives I/O commands from the various virtual machines (via the guest OSs running on those virtual machines) that are instantiated in the host computer system (e.g., 104*a*, FIG. 1). The kernel queues the I/O commands in one or more queues. The I/O commands are de-queued in first-in first-out (FIFO) order and sent down the I/O path (e.g., HBA, fabric port, storage array) of the virtual machine that sent the I/O command to the kernel.

In some embodiments, a high priority queue 1202 may be used to queue urgent I/O commands such as a swap command, heartbeat commands, transporting metadata, and so on. A default priority queue 1206 may be used to queue I/O commands that are not urgent. In accordance with the present disclosure, the kernel may provide VM-aware queues 1204*a*, 1204*b*, . . . , 1204*n* (collectively 1204) to support latency-sensitive I/O commands. Each VM-aware queue 1204*a*-1204*n* may be associated with a latency range or other suitable criterion to identify which latency-sensitive I/O commands it can queue. For example, queue 1204*a* is associated with the range Low-L1Max. This may be a range of time values representative of latency.

Figure 12A:
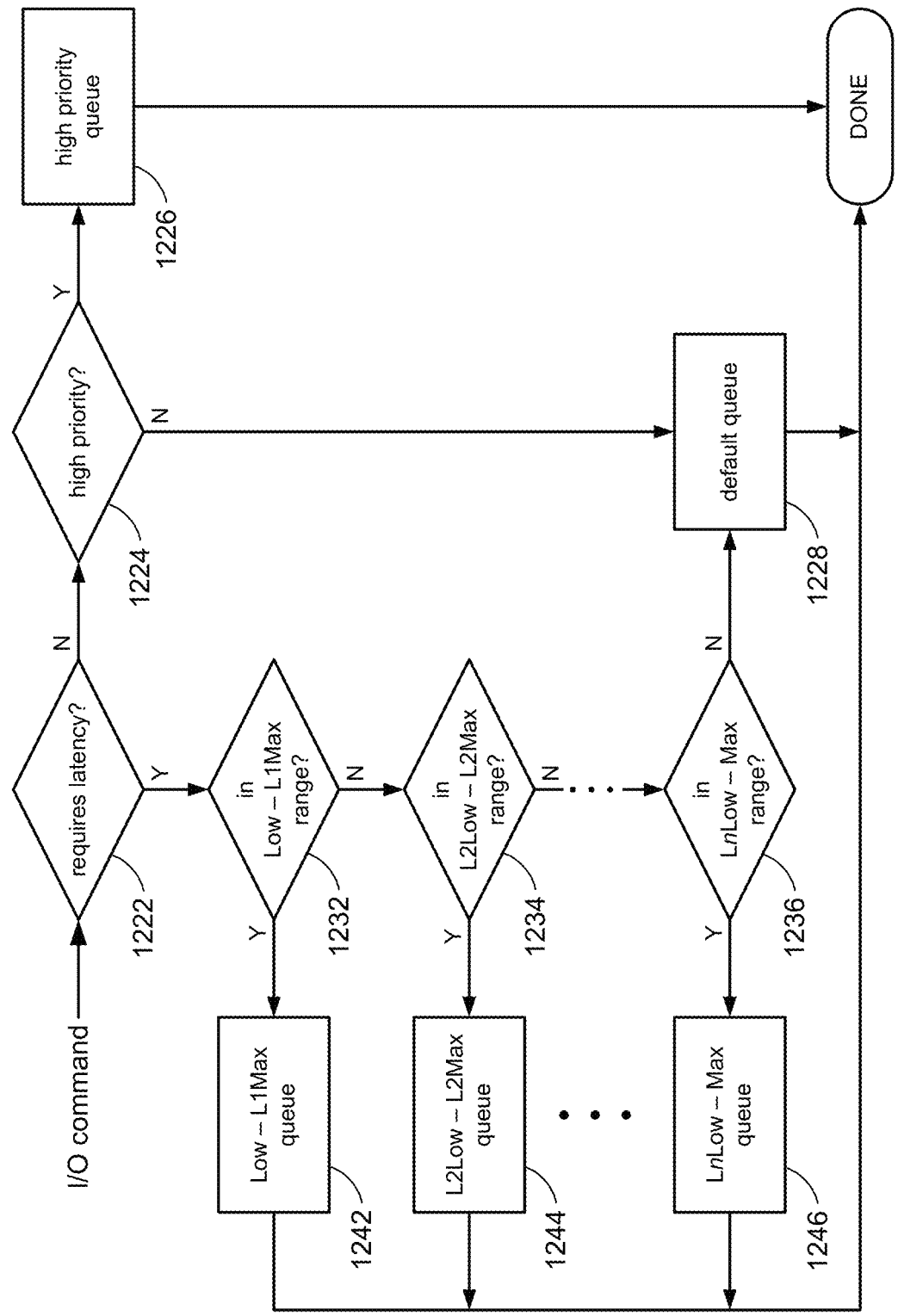
FIG. 12A illustrates queue processing in accordance with the present disclosure.

FIG. 12A illustrates how the VM kernel may queue an I/O command in accordance with the present disclosure. At 1222, in response to the kernel receiving an I/O command from a guest OS, the kernel determines if the received I/O command specifies a latency QOS requirement. In some embodiments, the latency QOS requirement may be specified in the structure of the command as, for example, shown above. If there is no latency QOS requirement, then at 1224, the kernel determines if the I/O command is a high priority command. For example, certain commands may be categorized as being high priority. If the I/O command is high priority, then it can be queued on the high priority queue 1202; for example, the I/O command may be added to the enc of the queue.

Continuing with 1222, if the I/O command does specify a latency QOS requirement, then the VM kernel may use the latency (e.g., ExpectedCompletionTime) as a criterion for placing the I/O command in an appropriate VM-aware queue 1204*a*-1204*n*. Thus, at 1232, 1234, . . . 1236, the kernel may determine which range the latency specified in the I/O command falls into an d queue the I/O command in the corresponding queue at 1242, 1244, . . . 1246. For example, at 1232, the kernel may test for Low≤ExpectedCompletionTime<L1Max, and similarly at 1234-1246. If processing falls out of 1224 or 1236, then the I/O command may be queued in the default queue 1206.

The VM kernel may de-queue previously queued I/O commands. In some embodiments, for example, the kernel may sequentially scan each queue in order of priority of the queues. The high priority queue 1202 may be scanned first. If there is an I/O command at the head of the queue 1202, then the I/O command is de-queued and sent down the I/O path that defines the virtual machine from which the I/O command was received. The kernel then proceeds to the VM-aware queues 1204, scanning and processing each queue 1204*a*, 1204*b*, . . . 1204*n* in a similar fashion; first queue 1204*a*, then 1204*b*, and so on to 1204*n*. Finally, the kernel may then process I/O commands in the default queue 1206.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments may relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for provisioning a virtual machine in a virtual machine infrastructure management server comprising:
receiving, by a computer, configuration information that identifies a plurality of data devices along communication channels connected between a plurality of virtual machine host computer systems and a plurality of storage devices;
receiving, by the computer, capability information for one or more of the data devices, the capability information comprising a metric relating to how one or more functions are performed by each data device;
receiving, by the computer, a virtual machine (VM) profile for a VM to be provisioned, wherein the VM profile sets forth minimum capabilities or capacities of one or more switch devices for the VM to be provisioned; and
provisioning, by the computer, the VM, including selecting one or more switch devices from among the plurality of data devices using the VM profile, each selected switch device having a capability or capacity that is equal to or greater than the minimum capability or capacity of a switch device set forth in the VM profile, wherein the virtual machine is provisioned using the selected one or more switch devices, wherein a communication channel between said one of the virtual machine host computer systems and one of the storage devices comprises the selected one or more switch devices.

2. The method of claim 1 further comprising receiving, by the computer, capability information for a composite data device from one of the virtual machine host computer systems, the composite data device identifying a storage device from among the plurality of storage devices and a host bus adapter (HBA) in said one of the virtual machine host computer systems that can access the storage device, the capability information of the composite data device based on storage capability information of the storage device and HBA capability information of the HBA, wherein the composite data device is included among the plurality of data devices.

3. The method of claim 2 wherein said one of the virtual machine host computer systems receives the HBA capability information from the HBA and the storage capability information from the storage device.

4. The method of claim 2 wherein said one of the virtual machine host computer systems defines a composite data device for each storage device that said one of the virtual machine host computer systems can reach.

5. The method of claim 1 wherein the capability information for said each data device includes one or more of information indicative of a data protection capability, information indicative of a data encryption capability, information indicative of a data isolation capability, information indicative of a data backup capability, information indicative of support for snapshot capability, or information indicative of an input/output latency time of said each data device.

6. The method of claim 1 wherein the configuration information identifies kinds of data devices and connectivity among the data devices.

7. The method of claim 1 wherein the data devices include HBAs in the virtual machine host computer systems and data switches in a switching fabric.

8. The method of claim 1 wherein the receiving of capability information for each data device includes for some of the data devices, the computer sending a request to said each data device to retrieve the capability information therefrom.

9. The method of claim 1 wherein some of the capability information is received on one or more of the communication channels.

10. The method of claim 1 wherein some of the capability information is received on a communication path separate from the communication channels.

11. A non-transitory computer-readable storage medium containing instructions for controlling a computer system to:
receive configuration information that identifies a plurality of data devices along communication channels connected between a plurality of virtual machine host computer systems and a plurality of storage devices;
receive capability information for one or more of the data devices, the capability information comprising a metric relating to how one or more functions are performed by each data device;
receive a virtual machine (VM) profile for a VM to be provisioned, wherein the VM profile sets forth minimum capabilities or capacities of one or more switch devices for the VM to be provisioned; and
provision the VM, including selecting one or more switch devices from among the plurality of data devices using the VM profile, each selected switch device having a capability or capacity that is equal to or greater than the minimum capability or capacity of a switch device set forth in the VM profile, wherein the virtual machine is provisioned using the one or more selected switch devices.

12. The non-transitory computer-readable storage medium of claim 11 further comprising instructions for controlling the computer system to receive capability information for a composite data device from one of the virtual machine host computer systems, the composite data device identifying a storage device from among the plurality of switches and a host bus adapter (HBA) in said one of the virtual machine host computer systems that can access the storage device, the capability information of the composite data device based on storage capability information of the storage device and HBA capability information of the HBA, wherein the composite data device is included among the plurality of data devices.

13. The non-transitory computer-readable storage medium of claim 12 wherein said one of the virtual machine host computer systems receives the HBA capability information from the HBA and storage capability information from the storage device.

14. The non-transitory computer-readable storage medium of claim 12 wherein a composite data device is defined for each storage device that said one of the virtual machine host computer systems can reach.

15. The non-transitory computer-readable storage medium of claim 11 wherein the capability information for said each data device includes one or more of information indicative of a data protection capability, information indicative of a data encryption capability, information indicative of a data isolation capability, information indicative of a data backup capability, information indicative of support for snapshot capability, or information indicative of an input/output latency time of said each data device.

16. The non-transitory computer-readable storage medium of claim 11 wherein the configuration information identifies kinds of data devices and connectivity among the data devices.

17. The non-transitory computer-readable storage medium of claim 11 wherein the receiving of capability information for each data device includes for some of the data devices, the computer system sending a request to said each data device to retrieve the capability information therefrom.

18. The non-transitory computer-readable storage medium of claim 11 wherein said one of the storage devices is compliant with said one of the policy profiles.

19. A computer system comprising:
one or more computer processors;
data connections to a plurality of virtual machine host computer systems; and
a computer-readable storage medium comprising instructions for controlling the one or more computer processors to:
receive configuration information that identifies a plurality of data devices along communication channels connected between the plurality of virtual machine host computer systems and a plurality of storage devices;
receive capability information for one or more of the data devices, the capability information comprising a metric relating to how one or more functions are performed by each data device;
receive a virtual machine (VM) profile for a VM to be provisioned, wherein the VM profile sets forth minimum capabilities or capacities of one or more switch devices for the VM to be provisioned; and
use the VM policy profile to provision the VM, including selecting one or more switch devices from among the plurality of data devices using the VM profile, each selected switch device having a capability or capacity that is equal to or greater than the minimum capability or capacity of a switch device set forth in the VM profile, wherein the virtual machine is provisioned using the one or more selected switch devices.

20. The computer system of claim 19 wherein the computer-readable storage medium further comprises instructions for controlling the one or more computer processors to receive capability information for a composite data device from one of the virtual machine host computer systems, the composite data device identifying a storage device and a host bus adapter (HBA) in said one of the virtual machine host computer systems that can access the storage device, the capability information of the composite data device based on storage capability information of the storage device and HBA capability information of the HBA, wherein the composite data device is included among the plurality of data devices.

* * * * *